May 22, 1945.  M. W. MORSE  2,376,802
ENDLESS TRACTION TREAD MECHANISM FOR VEHICLES
Filed April 10, 1942    3 Sheets-Sheet 1
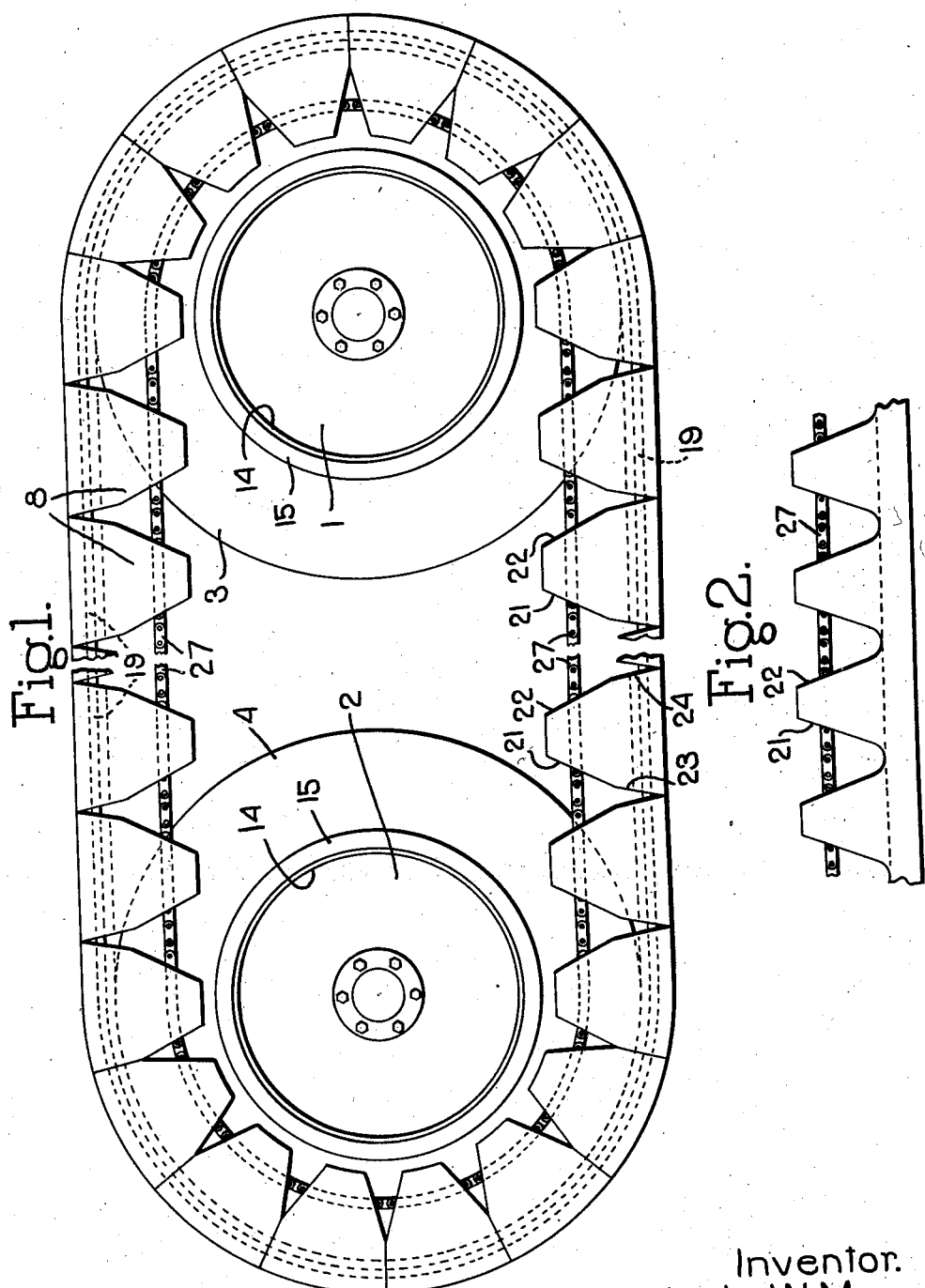
Inventor.
Malcolm W. Morse
by Heard Smith & Tennant.
Attys.

May 22, 1945. M. W. MORSE 2,376,802
ENDLESS TRACTION TREAD MECHANISM FOR VEHICLES
Filed April 10, 1942 3 Sheets-Sheet 2
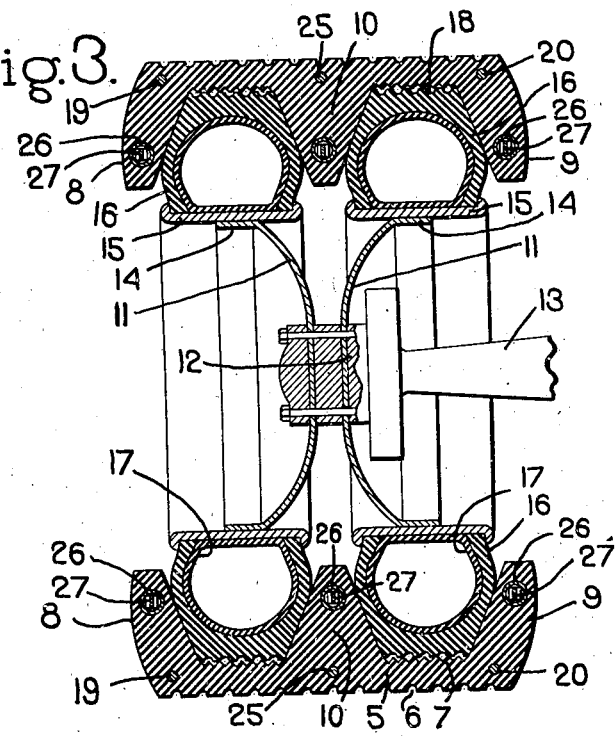
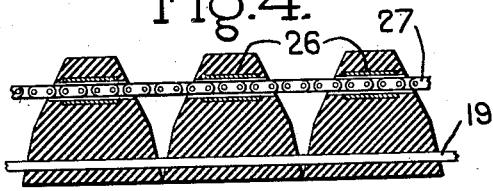
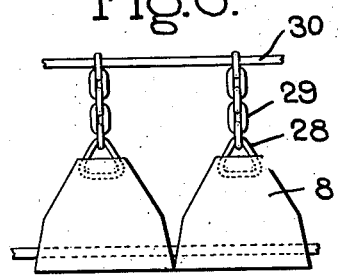
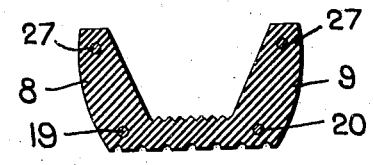
Inventor
Malcolm W. Morse
by Heard Smith & Tennant.
Attys.

May 22, 1945.  M. W. MORSE  2,376,802
ENDLESS TRACTION TREAD MECHANISM FOR VEHICLES
Filed April 10, 1942  3 Sheets-Sheet 3
Fig. 7
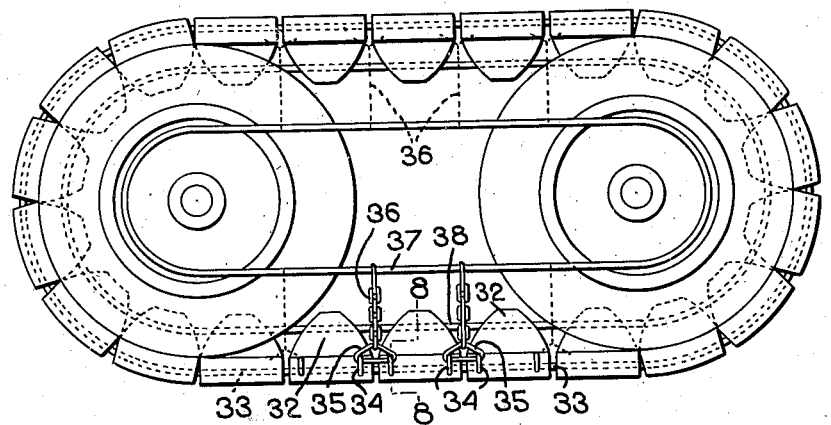
Fig. 8
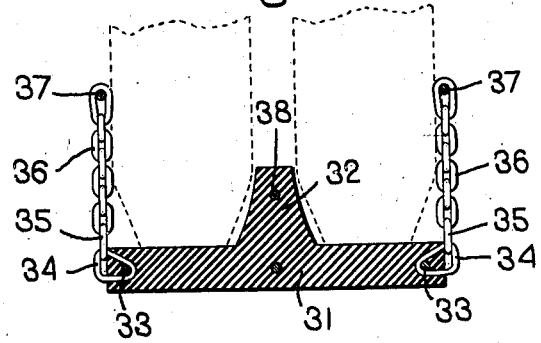
Fig. 9
Fig. 10
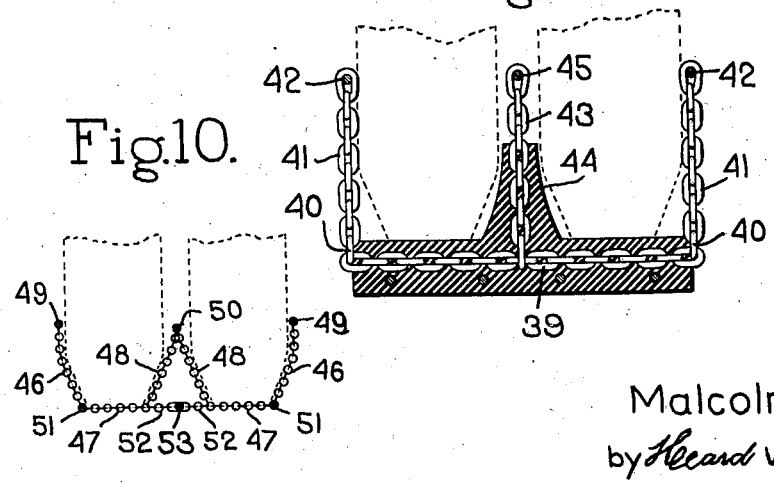
Inventor.
Malcolm W. Morse
by Heard Smith & Tennant.
Attys.

Patented May 22, 1945

2,376,802

UNITED STATES PATENT OFFICE 2,376,802

ENDLESS TRACTION TREAD MECHANISM FOR VEHICLES

Malcolm W. Morse, Boston, Mass.

Application April 10, 1942, Serial No. 438,387

14 Claims. (Cl. 305—8)

This invention relates to improvements in endless traction treads for vehicles having alined wheels or alined pairs of wheels mounted on parallel axles.

In usual types of endless traction tread mechanism for vehicles an endless tread member, formed of a plurality of flexibly connected plates, extends around the peripheries of two or more aligned wheels, and is provided with means to be effectively engaged by the driven wheel or wheels, usually in the form of a sprocket or sprockets fixedly mounted upon such wheels or the axles thereof, so that the tread is positively and continuously driven.

The object of the invention is to provide an endless tread or belt for any type of vehicle having alined wheels or pairs of alined wheels mounted on parallel axles in which the wheels are provided with pneumatic tires or other types of tires with the belt or tread extending around the alined wheels in such manner that it will be progressively laid down as an endless track to provide a continuous partially rigid tread having an extended area of contact with the terrain throughout the wheel base between the foremost and rearmost alined wheels and in which the belt is provided with side members, such as flanges, which will pass progressively alongside the tires of the wheels to minimize side slippage of the wheels upon the tread and also restrain the wheels from overriding the edge of the tread and thereby becoming detached therefrom.

In other words the object of the invention is to provide an endless tread for vehicles having in effect a groove or grooves to embrace the tires of the alined wheels and so constructed as to provide an endless, partially rigid track which will act as the vehicle is being driven as a progressively laid temporary corduroy road which will provide a substantially continuous terrain-engaging area of support between the alined wheels which will greatly increase the terrain surface contact over the area of contact of the pneumatic or other tires of individual wheels, thereby providing a suitable support which will enable the vehicle to be driven readily over snow, icy surfaces, loose sand, soft or rough ground, or over obstructions lying in the path of the vehicle.

The tread mechanism of the present invention differs from that of the prior art in that the progressively laying down of the track instead of being produced by positively driven sprocket mechanism or the like is produced by the frictional traction and torque accomplished through the contact and grip of the inner surfaces of the tread and to some degree by the inside of the flanges in their wrap-around said wheels in the arc of contact with the driving wheel or wheels and also by the pinching action and rotation of the driving wheel or wheels upon the tread when and where said tread contacts terrain over which the vehicle is passing. Where one or more of the alined wheels, are idler wheels, including intermediate idler wheels known as Lally wheels, such wheels are caused to rotate by the driving force from the driving wheel or wheels which is imparted to the idler or Lally wheel or wheels through the arc of contact of the tread engaging the periphery and to some extent the side wall portions of the flanges with the tires of the idler wheels thus causing them to impart motive force and action to the vehicle through action upon the tread when only part of said tread may engage the terrain under the vehicle and with the weight of the vehicle partly or entirely supported by the idler wheel or wheels at one or both sides of the vehicle.

More specifically the object of the present invention is to provide an endless tread of the character described having a longitudinal groove or grooves to receive the pneumatic or other ures of the vehicle which is formed by flanges extending aloneside the sides of the tires, and where dual wheels are employed alonside the adjacent sides of the tires of the dual wheels in such proximity thereto as properly to guide the endless tread member around the respective wheels.

A further object of the invention is to provide flexible endless members of shorter length than that of the body of the tread for continuously and positively supporting the side members or flanges in such manner as to hold them in proximity to the sides of the respective tires and thereby to limit sidewise slippage of the wheels on the body of the tread member and to prevent the wheels from overriding an edge of the tread.

Another object of the invention is to provide an endless tread of the character described with longitudinally extending flexible endless inextensible reenforcing members certain of which are adjacent to bases of the side flanges of the belt, and thereby reenforce the edge portions of the belt and the flanges extending upwardly therefrom.

A further object of the invention is to provide a traction tread of the character described which is constructed of a series of independent sections arranged end to end and provided with inwardly extending flanges having suitably tapered edge portions to permit the sections properly to pass around the alined wheels, the bodies of the sections being releasably connected together to permit replacement of worn sections and to provide easy adaptability of the belt to vehicles having varying distances between the axle centers and varying sizes of tires which would require special length of belt, the flanges being connected to an adjustable endless flexible member of such shorter length than that of the endless tread as to maintain the flanges in proximity to the sides of the tires of the respective wheels, the side members of the sections being so constructed as to enable sand, mud, snow and other material, which may become deposited in the grooves of the sections of the tread member, to escape or be discharged without interfering with the travel of the endless track member.

A further object of the invention is to provide a sectional endless tread member with means for reenforcing the sections thereof transversely as well as longitudinally.

Another object of the invention is to provide an endless tread construction for vehicles having pairs of dual wheels comprising tread members for the respective alined wheels so joined together as to provide an endless unitary construction.

These and other objects and features of the invention will more fully appear from the following description and the accompanying drawings and will be particularly pointed out in the claims.

Preferred embodiments of the invention are illustrated in the accompanying drawings, in which, Fig. 1 is a side elevation of an endless traction tread for vehicles formed of connected abutting sections and embracing the tires of alined wheels;

Fig. 2 is a detail sectional view of a modified form of the invention in which the endless traction belt is of flexible material and of integral construction;

Fig. 3 is a vertical sectional view of one of the pairs of dual wheels with an endless tread embodying the invention and embracing the tread and side walls of the tires of the wheels;

Fig. 4 is a detail longitudinal sectional view of a plurality of sections of an endless tread for alined wheels of vehicles showing the manner in which the sections are connected by flexible reenforcing members and the means for guiding the upper portions of the flanges and for maintaining the flanges in engagement with the sides of the tires of the alined wheels;

Fig. 5 is a detail illustration of two of the sections of the endless tread having different means for guiding the flanges and maintaining them in contact with the sides of the tires of the alined wheels;

Fig. 6 is a detail cross sectional view of an endless tread for single alined wheels;

Fig. 7 is a side elevation of a modified form of endless tread applied to alined vehicle wheels;

Fig. 8 is an enlarged transverse sectional view of one of the sections of the endless tread on line 8—8 Fig. 7, illustrating portions of the vehicle wheels in dotted lines;

Fig. 9 is a similar view of another modified form of the invention; and,

Fig. 10 is a transverse view of another modified embodiment of the invention in which the endless tread and side members are in the form of chains.

The invention as illustrated comprises an endless traction tread for vehicles having alined wheels provided with tires having a tractional periphery which comprises an endless belt having a body of thick flexible material extending around and substantially fitting the tread of the tires of the alined wheels and provided with side members such as flanges extending inwardly from the body alongside opposite sides of each of said tires.

The invention broadly comprises a novel endless tread of the character above described adapted to provide an extended tread surface for alined wheels, whether the alined wheels are single, dual or multiple, or whether the tread extends also around intermediate wheels and whether the tread is of endless integral construction or formed of abutting sections.

While the endless tread forming the subject matter of the invention in its broad scope is applicable to many known types of vehicles, machines, movable apparatus, equipment, and the like, having alined wheels, either single, dual or multiple, having single, dual or multiple tires, it is suggested that among others it is applicable to rear wheels alined in tandem for motorcycles, for mobile gun carriages, carriages of anti-aircraft guns, under carriages of heavy airplanes or amphibian planes and various trucks and vehicles. Installation of grooved or multi-grooved tread assemblies are also applicable to many of these same types of vehicles having dual or multi-wheels alined in tandem with dual or multi-tired installations on each wheel. The invention is particularly adaptable to heavy vehicles, machines and the like, whether one or more wheels or pairs of alined wheels are positively driven or motivated by other propelling power such as that propelling an airplane or by being towed or otherwise propelled.

In constructions of vehicles for carrying heavy loads it is increasingly usual to have two pairs of rear wheels, either of single or dual wheel construction, with means for driving one or both pairs of wheels, and some times one or more pairs of idler or Lally wheels to provide additional support for the load are installed on axles in parallelism to the axles of the driving wheels with the idler or Lally wheels in alinement with the driving wheels. Where constructions of this character are provided it frequently occurs that the driving wheels may slip on snow, ice, muddy or sandy terrain, etc., in such manner as to lose driving traction, or the driving wheels may dig into the surface of the terrain to such a degree that they cease to bear much or any of the weight of the load which has become shifted to the idler or Lally wheels which of themselves have no means of rotation. The endless tread of the present invention provides a substantially continuous terrain-engaging area of support between the alined wheels, including the Lally wheels, and the terrain which will greatly increase the terrain surface contact over and above the area of contact of the individual wheels, and will provide sufficient tractional grip between the idler wheels or Lally wheels and the terrain which together with the tractional grip between the tires of the driving wheels in their area of contact with the insides of the treads of the belt and the flanges of the sectional units or the tread and flanges of the integral belt construction as will develop sufficient tractional grip and torque as to cause the idler or Lally wheels to propel the vehicle irrespective of the character of the terrain being traversed.

The construction shown in the drawings illustrates various adaptations of the invention.

As illustrated in Fig. 1 the endless tread, which is applied to the alined wheels of a vehicle, is formed of a continuous series of sections abutting at their ends, preferably formed of resilient material, such as reenforced rubber composition, or if desired of plastic or other semi-rigid or rigid material, flexibly connected together in end to end relation by endless preferably inextensible flexible members, such as cables, chains, or the like.

Each of the sections is provided at its edges with upwardly extending flanges forming a groove or grooves to receive the peripheries of the pneumatic or other tires of the alined wheels. The flanges extend alongside the sides of the respective tires but are not intended to have such frictional engagement therewith as to produce substantial wear of the tires or flanges during normal operation of the tread. The flanges of the respective sections are provided with upwardly converging edge portions so constructed as to permit the body of the endless tread to bend snugly around the outermost of the alined wheels. Endless members of shorter length than the body or tread portion of the endless belt extend through or are connected to the upper portions of the flanges and serve to hold the flanges in upright position thereby to minimize the tendency of side slippage of the vehicle wheels on the belt and to prevent the wheels from overriding the flanges and thereby becoming detached from the belt.

Fig. 2 illustrates a similar embodiment of the invention in which the endless belt is of continuoue integral construction, such as reenforced rubber composition with flanges integral therewith having upwardly converging edges, and it will be understood that this construction is applicable to a plurality of single alined wheels or to dual alined wheels, as shown in Fig. 3, or to multiple wheels in alinement.

In the embodiment of the invention illustrated in Figs. 1 and 3 the rear frame of the vehicle (not shown) is provided with a plurality of pairs of dual rear wheels 1 and 2 each having similar tires 3 and 4 preferably of the pneumatic type. The traction tread comprises a series of sections abutting at their ends to provide a substantially continuous terrain-engaging area between the alined wheels, each section having a thick body portion 5 of rubber or rubber composition reenforced by heavy fabric or strong cords as in some known types of heavy duty industrial belting or which may be composed of other flexible, partly flexible material, or rigid material. The body desirably is provided with a roughened tread surface 6 of any suitable design, such as is employed in casings of automobile tires, and preferably also with a roughened surface 7 for engagement with the tires of the vehicle. The body of each section is provided with integral flanges 8 and 9 adapted respectively to lie alongside the outer surfaces of the tires of the alined wheels. Where dual wheels are employed the endless tread desirably, but not necessarily, is provided with a central longitudinally extending integral flange 10 preferably of equal height and conform'ng to and lying alongside the adjacent inner sides of the tires of the respective wheels.

Where two or more single alined wheels are employed the endless tread may be of U-shaped cross section as illustrated in Fig. 6.

An endless tread of this character may also be applied in parallel to either set of alined dual wheels or multiple wheels.

In the construction illustrated in Fig. 3 the dual wheels comprise a pair of oppositely disposed concave steel web sections which are suitably bolted to the hub of a shaft 13 and are provided with cylindrical peripheries 14 which are welded to channel steel rims 15. Pneumatic tire casings 16 are secured to the rims in the well known manner and are maintained in expanded position by usual pneumatic tubes 17. The tires may be of any usual character and desirably are provided with ribbed traction surfaces of any suitable design adapted to cooperate with the roughened surfaces 7 of the tread.

Desirably the endless tread is reenforced by preferably inextensible flexible members 19, 20 and 25, which are embedded in or extend through alined tubular apertures with or without short bushings, or other means to prevent wear on either or both the walls of the apertures and of the inextensible members, in the body of the tread adjacent to the bases of the flanges 8 and 9 which desirably conform generally to the surfaces of the sides of the respective tire casings.

As illustrated in Fig. 3 the central flange 10 is of general V-shape to conform to the adjacent surfaces of the tire casing. Preferably the grooves formed by the flanges 8, 9 and 10 are such as to avoid undue friction and wear between the adjacent surfaces of the flanges and the tire casings.

Inasmuch as the flanges of the endless traction tread are required to pass concentrically around the respective alined wheels the ends of the respective flanges are provided with inclined surfaces 21 and 22 (Figs. 1, 2 and 7), which will enable the body and flanges to conform to the circular contour of the tires of the wheels but which will spread apart as successive sections of the tread leave one wheel and pass horizontally to the other.

Where the endless tread is formed of a series of abutting sections the lower edge portions of each section may be provided with more steeply inclined walls 23 and 24, whereas if the endless tread is of flexible material, and of continuous integral construction, the inclined edges 21 and 22 may extend only to the body of the tread member, as illustrated in Fig. 2.

As illustrated in Fig. 3, in which the endless tread is provided with a central flange 10, an additional endless flexible reenforcing member 25, similar to the endless members 19 and 20, extends longitudinally of the central base portion and if desired the body of the endless tread may be provided with other similar intermediate reenforcing members. Where the endless tread is made of a series of sections the several sections are assembled upon inextensible flexible members such as the cables or chains 19, 20 and 25 which are preferably located in the body at or below the bases of the flanges 8, 9 and 10 and suitable couplings of any well known type may be provided for connecting the ends of the cables or chains at the junction of one or more pairs of adjacent sections.

Suitable flexible inextensible members, such as cables or chains, pass through the alined upper end portions of the flanges. They also may be embedded in the material but desirably are provided with suitable wear-preventing means, such as flexible bushings similar to the well known "BX" cable, or short bushings, or embedded sheaves, or other means, which are sufficiently movable longitudinally of the shorter inextensible member as not to interfere with the flexibility of the flanges as they pass around the respective wheels.

As illustrated in Figs. 3 and 4 each of the flanges 8, 9 and 10 of the respective sections is provided near its upper end with an aperture containing a short bushing 26 through which a cable or chain 27 extends, the cables or chains being of such shorter length than the cables or chains 19, 20 and 25 as to maintain the flanges in upright position relatively to the base of the tread and thereby to restrain lateral slippage of the wheels upon the endless tread and also to prevent the wheels from overriding the edges of the tread and becoming detached therefrom.

Suitable detachable coupling means, such as usual detachable links, may be provided for connecting the ends of the chains at the junctions of one or more adjacent sections in order to permit assemblage of the endless tread upon the alined wheels and to permit detachment and replacement of an injured section.

Various other forms of construction may be provided for connecting the upper end portion of the flanges to a suitable cable or chain, one of which is illustrated in Fig. 5 in which rings 28 desirably of triangular or circular form is partially embedded in the upper end portion of the respective flanges. The chains 29, which are connected thereto, are slidably suspended upon a suitable chain or cable 30 of such shorter length than that of the body of the tread member so as to maintain the flanges in upright position with relation thereto and to permit relative movement of the chains 29 longitudinally of the cable 30 when passing around the wheels.

Another embodiment of the invention, which is illustrated in Figs. 7 and 8, comprises an endless tread formed of assembled sections of suitable material each of which is provided with a body 31 of suitable thickness desirably having a central flange 32 extending longitudinally thereof adapted to extend between the adjacent sides of the tires of dual wheels in a manner similar to the central flange 10 heretofore described with respect to Figs. 1 and 3. In this construction endless cables or chains 33 are provided in proximity to the side edges and adjacent the ends of the respective sections and links 34, which are partially embedded in the respective sections in proximity to the ends thereof embrace the cables 33 and extend beyond the edges of the respective sections. The links 34 of adjacent sections are connected by a link 35 which in turn is connected to a chain 36 the uppermost link of which is slidably mounted upon an endless cable or chain 37 of such shorter length than that of the body portion of the traction tread as will hold the chains 36 vertically. The endless cables or chains 37 guide the side chains 36 alongside the outer surfaces of the tires and minimize sidewise slipping of the wheels upon the tread section and prevent the wheels from overriding the edges of the body of the tread.

The upper portion of the central flange desirably is also provided with an endless flexible cable or chain 38 which will reenforce the flange 32 and maintain it in vertical position. The central flange 32 thus aids in preventing side slippage of the wheels upon the body of the tread.

A modification of the construction shown in Figs. 7 and 8 is illustrated in Fig. 9 in which transverse chains 39 are preferably embedded in each of the sections adjacent the ends thereof and extend through the edges of the respective sections. The adjacent sections may be connected together by suitable links 40 similar to the links 35 on the construction illustrated in Fig. 8, and side chains 41 provided to connect the links 40 to an inextensible cable or chain 42 of such shorter length than that of the assembled body sections of the tread as will maintain the links 41 in vertical position alongside the outer sides of the wheels, as described in respect to Figs. 7 and 8. In this construction a central vertical chain 43, a portion of which is embedded in the central flange 44 of each of the sections, is connected at its lower end to the central portion of the transverse chain 39 and at its upper end is mounted upon an inextensible endless cable or chain 45 preferably of the same length as the chains or cables 42.

Another embodiment of the invention is illustrated in Fig. 10 which differs from the construction shown in Fig. 9 mainly by the omission of the terrain-engaging material of the several sections in which the cross chains 39 are embedded. The tread construction is shown in Fig. 10 as applied to dual wheels of the character illustrated in Figs. 1 and 3 and comprises a series of loops of cross chains supported in suitably spaced relation by inextensible flexible members so that the cross chains are adapted successively to pass around the foremost and rearmost tires of the alined wheels of the vehicle, one or more pairs of which are driven.

Each of the cross chains comprises an outer side section 46, a tread section 47, and an inner side section 48. The upper ends of the outer side sections 46 of the loops are fixedly secured in suitably uniformly spaced relation, as illustrated in Fig. 7, to inextensible endless cables or chains 49 and the upper ends of the inner looped sections 48 are likewise fixedly connected in correspondingly spaced relation to a common endless cable or chain 50. The cross chains are of such length as to cause the loops substantially to fit the tread surfaces and portions of the sides of the tires of the wheels as they successively pass around the wheels as the vehicle is being driven.

Desirably the links at the junction of the outer side sections 46 with the respective tread sections 47 of the chain loops are fixedly connected to endless inextensible flexible members 51. Desirably, but not necessarily, the links at the junction of the inner side members 48 with the tread members 47 are connected by chains 52 to an endless inextensible cable or chain 53 of the same length as the endless cables or chains 51.

By reason of this construction an endless tread is provided in which the inextensible members 51 and 52, together with the tread sections 47 of the chain loops, provide effective areas of contact throughout the length of the wheel base which will produce sufficient tractive engagement with the terrain to insure proper propulsion of the vehicle irrespective of the character of the terrain over which the vehicle is driven. The side sections 46 and 48 of the chain loops, which are suspended respectively from the endless inextensible members 48 and 50, also serve to restrain sidewise slippage of the wheels on the terrain-engaging sections 47 of the loops. Thus the embodiment of the invention illustrated in Fig. 10 contains the essential features of the invention heretofore described with respect to the other embodiments of the invention.

It will be understood that the particular embodiments of the invention shown and described herein are of an illustrative character and that various modifications in construction may be made within the spirit and scope of the following claims.

Having thus described the invention, what is claimed as new, and desired to be secured by Letters Patent, is:

1. A traction tread for vehicles having alined wheels provided with tires having a tractional periphery which comprises a flexible endless tread formed of a series of flexible transverse terrain-engaging sections, inextensible means connecting end portions of said sections together adjacent the terrain-engaging surface thereof in predetermined parallel relation, each of said terrain-engaging sections having side members extending inwardly from the respective ends of said sections adapted to pass alongside the sides of the wheels and continuous inextensible flexible members of relatively shorter length than that of said tread slidably connected to the upper portions of said side members acting to hold the side members in such proximity to the wheels as to prevent sidewise slippage of the wheels on the tread members or disengagement therefrom.

2. A traction tread for vehicles having a pair of dual wheels alined in tandem provided with tires having a tractional periphery which comprises a flexible endless terrain-engaging tread extending around and approximately fitting the tires of the alined dual wheels and formed of transverse substantially parallel flexible terrain-engaging sections, inextensible means fixedly connecting respectively the end portions and the central portions of said sections to form an endless tread, each of said terrain-engaging sections having members adapted to pass alongside the respective sides of the wheels and continuous inextensible flexible members of relatively shorter length than that of said tread slidably connected to the upper portions of said inwardly extending members acting to hold said inwardly extending members in such proximity to the outer and inner sides of the wheels as to prevent slippage of the wheels on the tread members or disengagement therefrom.

3. A traction tread for vehicles having alined wheels provided with tires having a tractional periphery which comprises a flexible endless terrain-engaging tread having a body formed of a series of adjacent sections of thick flexible material and extending around and approximately fitting the tread of the tires of said alined wheels and provided with flanges extending inwardly from said sections alongside opposite sides of each of said tires endless inextensible reenforcing means within said body between the bases of said flanges and the tread surface of said body, and endless inextensible flexible means of shorter length than that of said body slidably connected to upper portions of the respective flanges acting to hold the flanges in proximity to the sides of the respective tires thereby to prevent sidewise slippage of the wheels on said body or detachment therefrom.

4. A traction tread for vehicles having alined wheels provided with tires having a tractional periphery which comprises a flexible endless terrain-engaging tread having a body formed of a series of adjacent sections of thick flexible material and extending around and approximately fitting the tread of the tires of said alined wheels and provided with flanges extending inwardly from said sections alongside opposite sides of each of said tires, flexible endless inextensible members embedded in said body adjacent to the tread surface thereof, bushings embedded in the upper portions of said flanges, and endless inextensible flexible means of shorter length than that of said body mounted in said bushings acting to hold the flanges in proximity to the sides of the respective tires, thereby to prevent sidewise slippage of the wheels on said body or detachment therefrom.

5. A traction tread for vehicles having alined wheels provided with tires having a tractional periphery which comprises a flexible terrain-engaging tread formed of a series of sections of suitable material connected together by parallel flexible inextensible members imbedded therein adjacent to the tread surfaces thereof and extending around and approximately fitting the aligned wheels to provide a progressively laid substantially continuous terrain-engaging area between said aligned wheels, each of said sections having side members extending inwardly from the terrain-engaging sections adapted to pass alongside the sides of the wheels and inextensible flexible members of relatively shorter length than the terrain-engaging tread slidably connected to the respective side members to permit relative movement therebetween longitudinally of the shorter inextensible members when said tread sections pass around the wheels and acting to hold the side members in proximity to the sides of the wheels thereby to prevent sidewise slippage of the wheels on the tread or disengagement therefrom.

6. A traction tread for vehicles having pairs of dual wheels alined in tandem provided with tires having a tractional periphery and of which at least one of said pairs of dual wheels is driven which comprises a flexible endless terrain-engaging tread extending around and approximately fitting the tires of the alined dual wheels and formed in sections having a central longitudinally extending tapering flange substantially conforming to the adjacent inner surfaces of the respective alined wheels and connected together by endless inextensible flexible members, side members extending inwardly from the end portions of the respective sections and inextensible members of relatively shorter length than that of said tread slidably connected to the upper portions of the respective side members and the upper portions of said flange sections acting to prevent sidewise slippage of the wheels on said tread sections and detachment therefrom.

7. A traction tread for vehicles having pairs of dual wheels alined in tandem provided with tires having a tractional periphery and of which at least one of said pairs of dual wheels is driven which comprises a flexible endless terrain-engaging tread extending around and approximately fitting the tires of the alined dual wheels and formed in sections each having a central longitudinally extending tapering flange and inwardly extending tapering flanges adjacent the edges thereof forming grooves substantially conforming to the tires of the respective alined wheels and endless members of relatively shorter length than that of said tread slidably connected to the upper portions of the respective flanges acting to prevent sidewise slippage of the wheels on said tread sections and detachment therefrom.

8. A traction tread for vehicles having pairs of dual wheels alined in tandem provided with tires having a tractional periphery which comprises a flexible endless terrain-engaging tread extending around and approximately fitting the tires of the alined dual wheels and formed in sections having a central longitudinally extending tapering flange substantially conforming to the adjacent inner surfaces of the respective alined wheels and connected together by endless inextensible flexible members certain of which are adjacent the edges of said sections, inwardly extending side chains having links embedded in the respective sections adjacent the edges thereof and endless inextensible members connected at their lower ends to said chains and at their upper ends to inextensible members of such shorter length than said tread as to maintain said side chains in proximity to the outer sides of the alined wheels thereby to prevent side slippage of the wheels upon the tread sections and detachment therefrom.

9. A traction tread for vehicles having pairs of dual wheels alined in tandem provided with tires having a tractional periphery and of which at least one of said pairs of dual wheels is driven which comprises a flexible endless terrain-engaging tread extending around and approximately fitting the tires of the alined dual wheels and formed in sections having a central longitudinally extending tapering flange substantially conforming to the adjacent inner surfaces of the respective alined wheels and connected together by endless inextensible flexible members, transverse chains embedded in said tread sections, side chains having links connected to the end links of the cross chains of adjacent members and connected at their upper ends to inextensible members of such shorter length than said tread thereby to prevent sidewise slippage of the wheels on said tread sections and detachment therefrom.

10. A traction tread for vehicles having pairs of dual wheels alined in tandem provided with tires having a tractional periphery and of which at least one of said pairs of dual wheels is driven which comprises a flexible endless terrain-engaging tread extending around and approximately fitting the tires of the alined dual wheels and formed in sections having a central longitudinally extending tapering flange substantially conforming to the adjacent inner surfaces of the respective alined wheels and connected together by endless inextensible flexible members, transverse chains embedded in said tread sections, side chains having links connected to the end links of the cross chains of adjacent members, and a central inwardly extending chain embedded in said central flange and endless members connected to the upper ends of said side chains and said central chain of such shorter length than said tread thereby to prevent sidewise slippage of the wheels on said tread sections and detachment therefrom.

11. A traction tread for vehicles having pairs of dual wheels alined in tandem provided with tires having a tractional periphery which comprises tread sections formed of equally spaced chain loops conforming approximately to the contours of the tires of the dual wheels, endless inextensible members connecting the respective chain loops together adjacent the junction of the terrain-engaging portions of the respective loops and the outer sides thereof and inextensible members connecting the upper ends of the inner and outer side members of the respective loops of such shorter length as to cause said side members to conform approximately to the inner and outer side surfaces of the tires thereby to prevent sidewise slippage of the wheels upon the terrain-engaging portions of the loops and to prevent detachment of the wheels therefrom.

12. A traction tread for vehicles having pairs of dual wheels alined in tandem provided with tires having a tractional periphery and of which at least one of said pairs of dual wheels is driven which comprises tread sections formed of equally spaced chain loops conforming approximately to the contours of the tires of the dual wheels, endless inextensible members connecting the respective chain loops together adjacent the junction of the terrain-engaging portions of the respective loops and the outer sides thereof and inextensible members connecting the upper ends of the inner and outer side members of the respective loops of such shorter length as to cause said side members to conform approximately to the inner and outer side surfaces of the tires thereby to prevent sidewise slippage of the wheels upon the terrain-engaging portions of the loops and to prevent detachment of the wheels therefrom, and supplementary chains connecting the junctions of the inner sections of the side chains with the tread-engaging sections thereof, and endless inextensible members connecting the central portions of the supplementary chains thereby to cause said cross chains to provide in effect grooves for the traverse of the dual wheels as the cross chains successively pass beneath the respective alined wheels.

13. A traction tread for vehicles having alined wheels provided with tires having a tractional periphery, which comprises a flexible endless tread extending around the tires of the alined wheels having transversely flexible terrain-engaging means with spaced inextensible flexible endless members located in proximity to the terrain-engaging means and in proximity to the vertical planes of the sides of the tires of the alined wheels and flexible side members extending vertically inwardly from the terrain-engaging means frictionally engaging the respective sides of the tires at such spaced intervals as to extend substantially radially of the wheels during their passage around the respective tires and continuous inextensible members of relatively shorter length than that of the tread slidably connected to the inner ends of said side members acting to hold said side members in such proximity to the inner and outer sides of the respective tires as to prevent sidewise slippage of the wheels on the tread or disengagement therefrom.

14. A traction tread for vehicles having pairs of dual wheels alined in tandem provided with tires having a tractional periphery and of which at least one of said pairs of dual wheels is driven, which comprises a flexible endless tread extending around the tires of the respective alined pairs of dual wheels having transversely flexible terrain-engaging means with spaced inextensible flexible endless members located in proximity to the terrain-engaging means and in proximity to the respective sides of each of the tires of the alined wheels and flexible side members extending vertically inwardly from the terrain-engaging means frictionally engaging respectively the outer and inner sides of the tires of the dual wheels at such spaced intervals as to extend substantially radially from the wheels during their passage around the respectvie tires and continuous inextensible members of relatively shorter length than that of the tread respectively slidably connected to the inner ends of each of the outer side members and to the side members extending inwardly alongside the adjacent sides of the dual wheels.

MALCOLM W. MORSE.